US011994085B2

(12) United States Patent
Petrus et al.

(10) Patent No.: US 11,994,085 B2
(45) Date of Patent: May 28, 2024

(54) PISTON FOR USE IN INTERNAL COMBUSTION ENGINES AND METHOD OF MAKING THE PISTON

(71) Applicant: GM Global Technology Operations LLC, Detroit, MI (US)

(72) Inventors: Ronald John Petrus, Lake Orion, MI (US); Jared Matthew Satkowiak, Grand Blanc, MI (US); Hsiao F. Wong, Farmington Hills, MI (US); Kenneth E. Schroeder, Sanford, MI (US); Qigui Wang, Rochester Hills, MI (US); Richard D. Ricchi, Lapeer, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 17/809,421

(22) Filed: Jun. 28, 2022

(65) Prior Publication Data

US 2023/0417203 A1    Dec. 28, 2023

(51) Int. Cl.
*F02F 3/00* (2006.01)
*B22F 10/366* (2021.01)
(Continued)

(52) U.S. Cl.
CPC .......... *F02F 3/0084* (2013.01); *B22F 10/366* (2021.01); *B33Y 40/10* (2020.01);
(Continued)

(58) Field of Classification Search
CPC . F02F 3/0084; F02F 2003/0007; B33Y 80/00; B33Y 10/00; C22C 21/00; B22F 2301/052; B22F 10/28
See application file for complete search history.

(56) References Cited

U.S. PATENT DOCUMENTS

| 10,151,269 B2 | 12/2018 | Brown et al. |
| 2010/0139480 A1* | 6/2010 | Ohmori ................... F16J 1/001 92/239 |

(Continued)

FOREIGN PATENT DOCUMENTS

| CN | 102560206 A | * | 7/2012 | |
| CN | 113250849 A | * | 8/2021 | ............. C04B 35/48 |

(Continued)

OTHER PUBLICATIONS

Günnel, T., "Pistons from the 3D printer for the Porsche GT2 RS" and English translation, Jul. 13, 2020, <https://www.automobil-industrie.vogel.de/porsche-gt2-rs-kolben-3d-druck-additive-fertigung-mahle-zeiss-trumpf-unterschrift-a-1bde68aed17c30998b245fb36ad98375/>.

(Continued)

*Primary Examiner* — Hung Q Nguyen
(74) *Attorney, Agent, or Firm* — Vivacqua Crane, PLLC

(57) ABSTRACT

An additive manufactured piston having a crown portion and a skirt portion form of an aluminum-cerium-silicon alloy. The piston includes a least one recess pocket in an unstressed region located at an interface between an inner surface of the crown portion and an outer surface of the skirt portion. The skirt portion includes an outer panel surface defining an external rib adjacent a peripheral end surface, at least one stiffening rib extending from a pin boss to a skirt end, and a wall thickness of between 0.2 mm and 1.0 mm in a region between the external rib and the at least one stiffening rib. The skirt portion further includes an internal first rib having a width W1 on a thrust side portion and an internal second rib having a width W2 located on an anti-thrust side portion, in which W1 is greater than W2.

20 Claims, 5 Drawing Sheets

(51) Int. Cl.
  *B33Y 40/10*  (2020.01)
  *B33Y 80/00*  (2015.01)
  *C22C 21/00*  (2006.01)
  *B22F 10/28*  (2021.01)
  *B33Y 10/00*  (2015.01)

(52) U.S. Cl.
  CPC .............. *B33Y 80/00* (2014.12); *C22C 21/00* (2013.01); *B22F 10/28* (2021.01); *B22F 2301/052* (2013.01); *B33Y 10/00* (2014.12); *F02F 2003/0007* (2013.01)

(56) References Cited

U.S. PATENT DOCUMENTS

| | | | | |
|---|---|---|---|---|
| 2013/0233270 | A1* | 9/2013 | Brandt | F02F 3/0076 |
| | | | | 123/193.6 |
| 2014/0299091 | A1 | 10/2014 | Ribeiro et al. | |
| 2016/0115899 | A1* | 4/2016 | Riffe | F02F 3/00 |
| | | | | 123/193.6 |
| 2016/0123274 | A1* | 5/2016 | Miller | F02F 3/00 |
| | | | | 123/41.35 |
| 2017/0241374 | A1* | 8/2017 | Scherbaum | F02F 3/0076 |
| 2020/0072158 | A1* | 3/2020 | Müller | F16J 1/02 |

FOREIGN PATENT DOCUMENTS

| | | | | |
|---|---|---|---|---|
| DE | 102005041001 | A1 | 3/2007 | |
| DE | 102015200314 | A1 * | 7/2015 | .............. F02F 3/003 |
| DE | 102017113163 | A1 | 12/2017 | |
| EP | 1926903 | B1 * | 3/2010 | ............ F02F 3/0076 |
| GB | 2367602 | A * | 4/2002 | ................ F02F 3/00 |
| JP | H061750 | U | 1/1994 | |
| JP | H06248383 | A * | 9/1994 | |
| JP | H08260089 | A * | 10/1996 | |
| JP | 2000210752 | A * | 8/2000 | |
| JP | 2000213412 | A * | 8/2000 | |
| JP | 2005248949 | A * | 9/2005 | ............ F02F 3/0076 |
| JP | 2005299484 | A * | 10/2005 | |
| JP | 4185364 | B2 * | 11/2008 | ................ B22F 3/16 |
| JP | 2008286178 | A * | 11/2008 | |
| JP | 2010164012 | A * | 7/2010 | |
| JP | 2019506567 | A * | 3/2019 | |
| KR | 20140123600 | A * | 10/2014 | |
| WO | WO-0123629 | A1 * | 4/2001 | ................ B22F 7/02 |
| WO | 2020089299 | A1 | 5/2020 | |

OTHER PUBLICATIONS

Mahle GmbH. "Pistons and engine testing," and English translation, company publication, 2011, p. 30.

* cited by examiner

PISTON FOR USE IN INTERNAL COMBUSTION ENGINES AND METHOD OF MAKING THE PISTON

GOVERNMENT CLAUSE

This invention was made with government support under Grant No. DE-EE0008877 awarded by the U.S. Department of Energy. The Government has certain rights in this invention.

INTRODUCTION

The present disclosure relates generally to pistons for use in internal combustion engines and a method of making the piston by additive manufacturing.

Internal combustion engine manufacturers have a continual need to improved engine efficiencies and performances. These improvements include, but are not limited to, increased fuel economy, cleaner fuel combustion, and increased power output. One component of the internal combustion engine that has opportunities to improve on these goals is the piston. A goal of a piston design is to have a piston that is lighter to reduce the reciprocating mass and vehicle weight reduction. A lighter piston allows mass to be taken out of the crankshaft counterweights and reduces the overall engine secondary shaking forces. An efficient method for the manufacture of such a piston is also desired.

Aluminum alloys are used in the manufacturing of pistons for weight savings. Such aluminum pistons are typically made by casting and/or forging. Due to the constraints of castability and casting/forging processes, the physical designs of piston are limited in order to maintain a required minimum wall thickness and geometries conducive to casting and/or forging. Examples of geometry limitations for cast pistons include, but are not limited to, the restrictions of undercuts and the requirements of hash markings to facilitate the removal of the cast piston from the casting dies. Forging of aluminum piston also has similar geometry limitations. Pistons made by casting are also limited as to the choice of metal alloys that are suitable for casting processes.

Thus, while current pistons designs and methods of manufacturing such piston designs achieve their intended purpose, there is a continual need for improvements of piston designs for weight reduction while maintaining or improving the desirable mechanical properties of the pistons, as well as an efficient method for manufacturing such improved piston designs.

SUMMARY

According to several aspects, a piston for an internal combustion engine of a vehicle is disclosed. The piston includes a crown portion and a skirt portion. The crown portion includes a peripheral side surface and an inner crown surface. The skirt portion includes a pair of skirt ends extending from the peripheral side surface and a pair of skirt panels extending from the inner crown surface and interconnecting the pair of skirt ends. At least one of the skirt panels include an outer panel surface, an inner panel surface opposite the outer panel surface, and a pin boss. The outer panel surface cooperates with the inner crown surface to define at least one recessed pocket at an interface between the outer panel surface and the inner crown surface.

In an additional aspect of the present disclosure, the at least one recessed pocket includes an elongated recessed pocket located between the pin boss and the peripheral side surface of the crown portion.

In another aspect of the present disclosure, the at least one recessed pocket further includes a first recessed pocket and a second recessed pocket sandwiching the elongated recessed pocket therebetween In another aspect of the present disclosure, the skirt portion further includes a peripheral distal end surface. The outer panel surface of one of the pair of skirt panels defines an external rib adjacent the peripheral distal end surface and at least one stiffening rib extending from the pin boss to one of the pair of skirt ends. The one of the pair of skirt panels includes a wall portion defined between the external rib and the at least one stiffening rib. The wall portion includes a wall thickness of between 0.2 mm and 1.0 mm.

In another aspect of the present disclosure, the pin boss of the at least one of the pair of skirt panels defines a piston pin-bore having a center-line off-set from a geometric center-line of the piston thereby defining (i) a thrust side portion between one of the skirt ends and the center-line of the piston pin-bore, and (ii) an anti-thrust side portion between the other of the skirt ends and the center-line of the piston bore. The inner panel surface of the at least one of the pair of skirt panels defines a first internal rib on the thrust side portion and a second internal rib on the anti-thrust side portion. The first internal rib includes a first width (W1) and the second internal rib includes a second width (W2), wherein W1 is greater than W2.

In another aspect of the present disclosure, the piston is a single piece monobloc body having a plurality of sintered layers of a metal alloy. The layers are perpendicular to a direction of a force generated by a combustion process acting on the piston.

In another aspect of the present disclosure, the metal alloy includes from about 5 to 15 wt % cerium (Ce), from about 0.1 to 5 wt % silicon (Si), from 0.1 to 5 wt % nickel (Ni), from about 0.1 to 2 wt % zirconium (Zr), and a balance wt % of aluminum (Al). Preferably, about 7 to 10 wt % Ce, from about 0.5 to 2 wt % S, from about 2 to 4 wt % Ni, from about 0.5 to 1.5% Zr, and a remaining balance wt % Al.

In another aspect of the present disclosure, one or more of the plurality of the sintered layers of metal alloy includes a thickness of from 0.02 millimeter (mm) to 0.1 mm.

According to several aspects, an additive manufactured piston, formed of a metal alloying having from about 5 to 15 wt % cerium (Ce), from about 0.1 to 5 wt % silicon (Si), from 0.1 to 5 wt % nickel (Ni), from about 0.1 to 2 wt % zirconium (Zr), and a balance wt % of aluminum (Al) is disclosed.

In an additional aspect of the present disclosure, the piston includes a skirt panel having an inner panel surface, an outer panel surface, and a wall portion having a thickness of between 0.2 mm and 1.0 mm between the inner panel surface and the outer panel surface.

In another aspect of the present disclosure, the skirt panel further includes a thrust side portion, an anti-thrust side portion, a first internal rib located defined on the inner panel surface of the skirt portion on the thrust side portion, and a second internal rib defined on the inner panel surface on the anti-thrust side portion. The first internal rib includes a width (W1) and the second internal rib includes a width (W2), and wherein W2 is less than W1.

In another aspect of the present disclosure, the piston further includes a crown portion having an inner crown surface. The outer panel surface defines a plurality of recessed pockets located at an interface between the inner crown surface and the outer panel surface.

In another aspect of the present disclosure, the piston further includes a plurality of sintered layers perpendicular to a direction of force exerted on the crown portion of the piston by a combustion process.

According to several aspects, a method of additive manufacturing a piston is disclosed. The method includes sintering a plurality of layers of a powdered metal alloy to build a monobloc piston. The metal alloy includes from about 5 to 15 wt % cerium (Ce), from about 0.1 to 5 wt % silicon (Si), from 0.1 to 5 wt % nickel (Ni), from about 0.1 to 2 wt % zirconium (Zr), and a balance wt % of aluminum (Al). Preferably, about 7 to wt % Ce, from about 0.5 to 2 wt % S, from about 2 to 4 wt % Ni, from about to 1.5% Zr, and a remaining balance wt % Al.

In an additional aspect of the present disclosure, the method further includes pre-heating the powdered metal alloy at a temperature of 300° C. to 400° C. before sintering, maintaining the powdered metal alloy at the temperature of 300° C. to 400° C. during sintering, and maintaining the sintered layers of the powdered metal alloy at the temperature of 300° C. to 400° C. for 5 to 10 hours.

In another aspect of the present disclosure, the sintered layers are perpendicular to a direction of force exerted on the piston by an internal combustion process.

In another aspect of the present disclosure, one or more of the layers includes a thickness of between about 0.02 millimeter (mm) to 0.1 mm.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale, and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
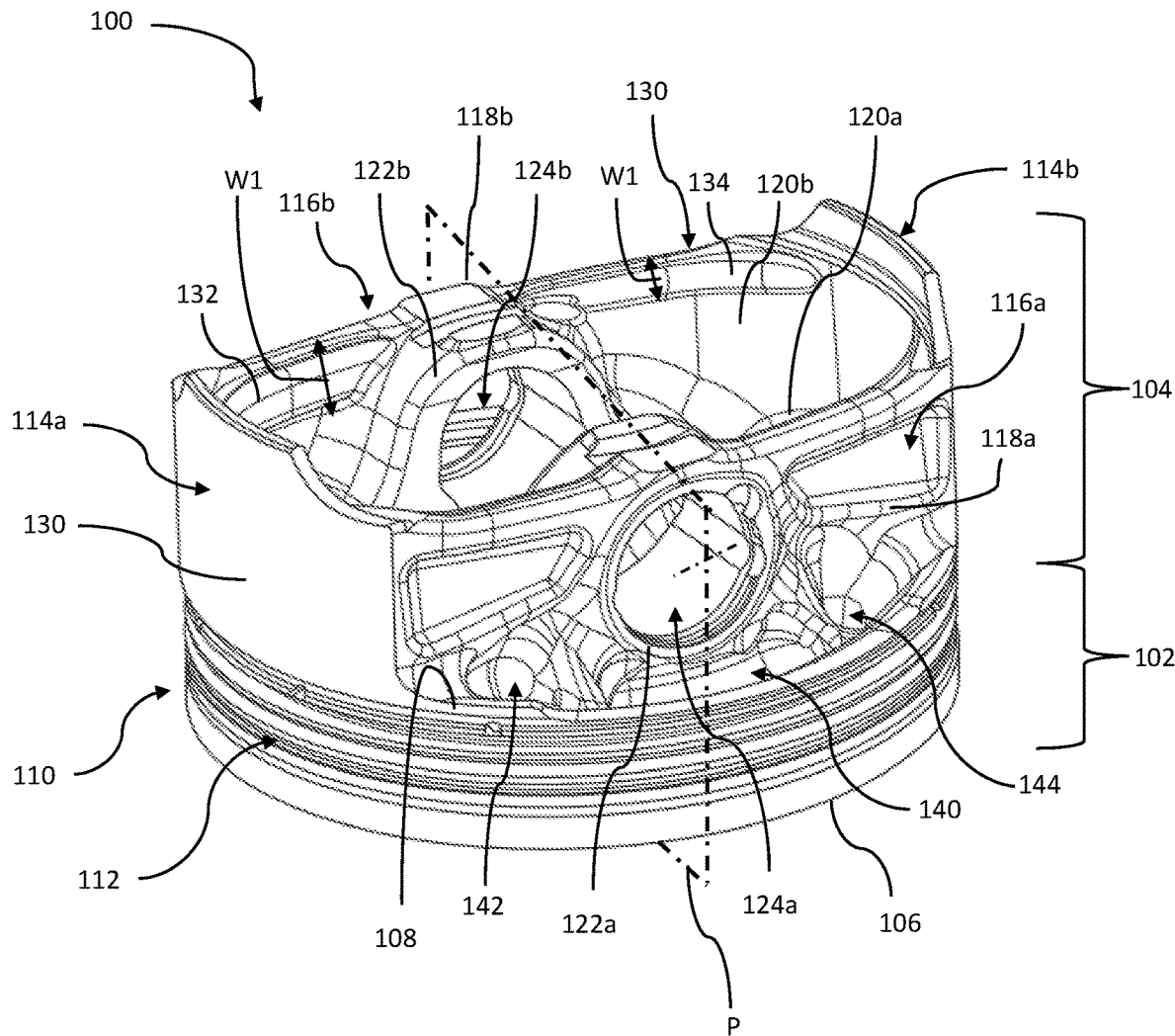
FIG. 1 is a perspective view of a piston, according to an exemplary embodiment.
Figure 2:
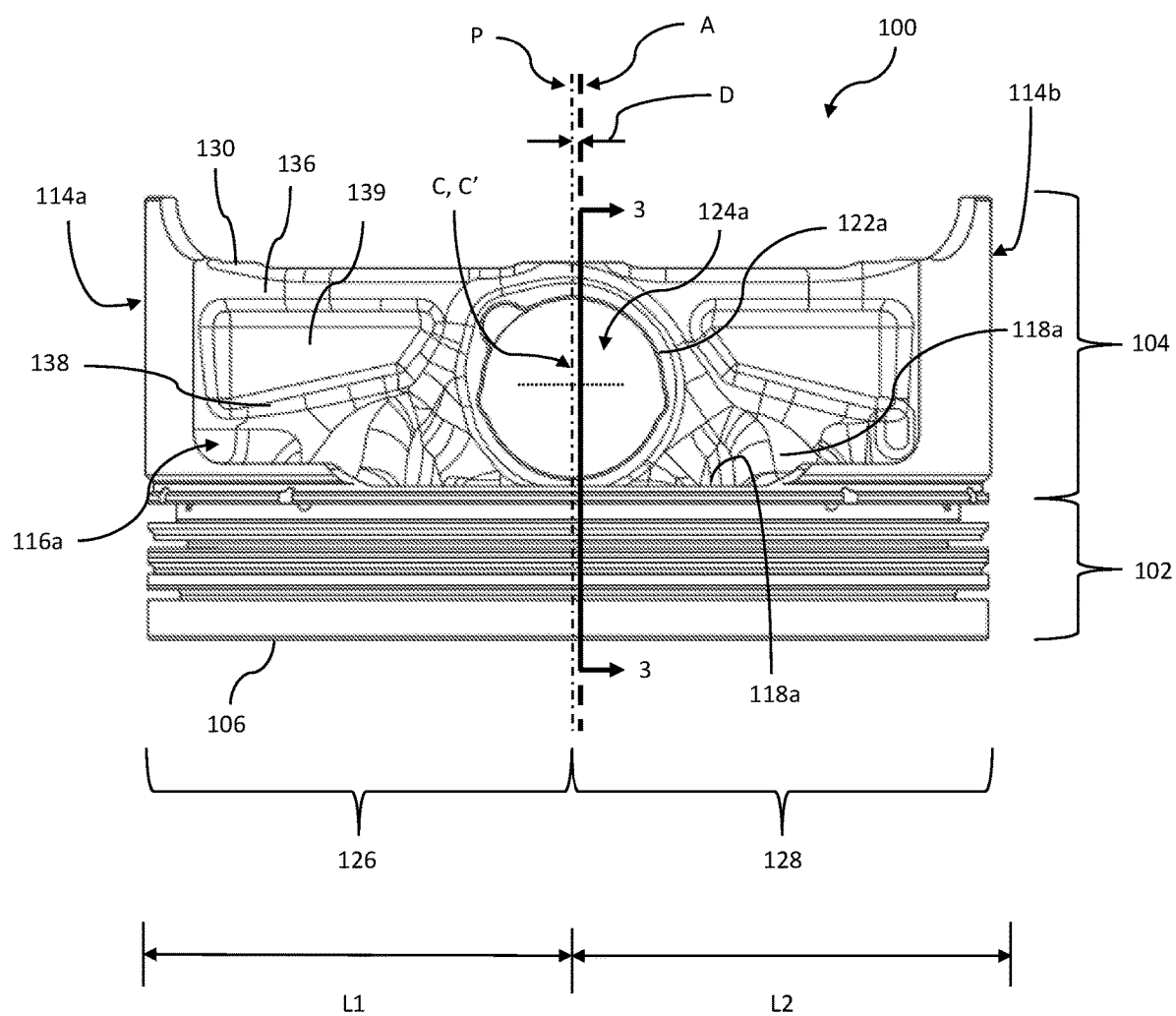
FIG. 2 is a side view of the piston of FIG. 1, according to an exemplary embodiment.
Figure 3:
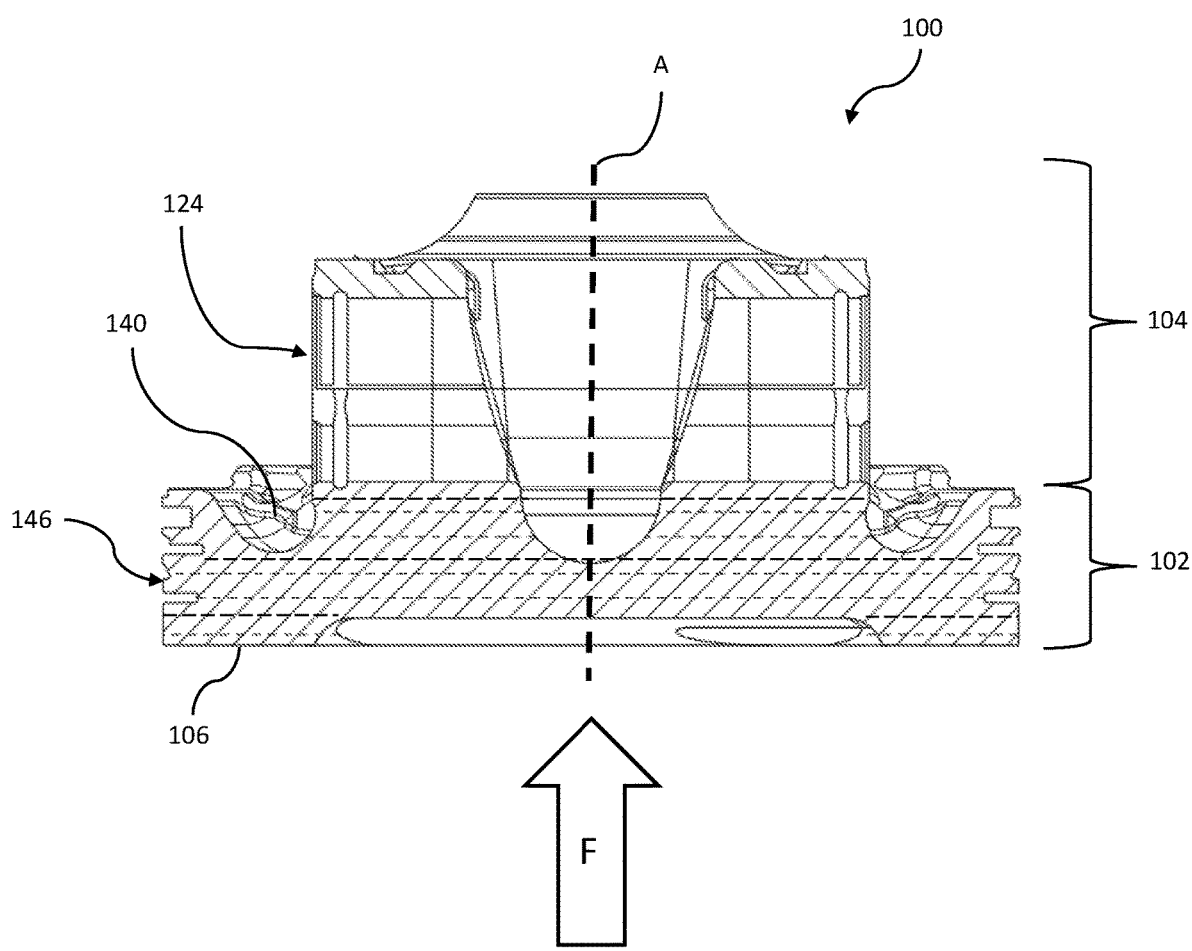
FIG. 3 is a cross-section view of FIG. 2 along line 3-3, according to an exemplary embodiment.

FIG. 1 through FIG. 3 illustrate an additive manufactured piston 100 for an internal combustion engine of a vehicle. The additive manufacturing process provides opportunities for the piston 100 to incorporate features and material choices not previously available to other manufacturing processes, such as casting or forging. The piston 100 is single piece monobloc design configured for use in different types of internal combustion engines including two or four stroke internal combustion engines, and in various combustion modes, such as spark or compression ignition modes. Additive manufacturing techniques, such as 3-dimensional printing (3-D printing) by utilizing direct metal laser sintering (DMLS), may be used to build the piston 100.

The piston 100 includes a crown portion 102 and a skirt portion 104 extending axially from the crown portion 102. The crown portion 102 includes an outer crown surface 106 and an opposite facing inner crown surface 108. The outer crown surface 106 is exposed to engine combustion gases, while the inner crown surface 108 is exposed to crankcase fluids including air, oil vapor, and liquid oil droplets or spray during normal engine operations. The outer crown surface 106 may include a suitable shape or configuration for optimizing fuel combustion and power output of the internal combustion engine. The crown portion 102 includes a peripheral side surface 110 extending from the outer crown surface 106 to the skirt portion 104. The peripheral side surface 110 defines a plurality of ring grooves 112 for receiving piston rings (not shown) configured to cooperate with the combustion cylinder wall of the engine to prevent blow-by gases from escaping around the peripheral side surface 110 of the crown portion 102.

The skirt portion 104 includes a pair of skirt ends 114a, 114b extending from the peripheral side surface 110 of the crown portion 102 and a pair of skirt panels 116a, 116b interconnecting the pair of skirt ends 114a, 114b. The pair of skirt panels 116a, 116b extends from the inner crown surface 108 and spaced from the peripheral side surface 110 of the crown portion 102. Each of the skirt panels 116a, 116b includes an outer panel surface 118a, 118b, an opposite inner panel surface 120a, 120b, and a pin boss 122a, 122b defining a piston pin-bore 124a, 124b configured to receive a wrist pin (not shown) that connects the piston 100 with a connecting rod (not shown) of the engine.

Best shown in FIG. 2, the piston 100 includes a vertical geometric center-line A with respect to the side-view of the piston 100. The piston pin-bore 124a of the skirt panel 116a includes a center-line C extending through the center of the piston pin-bore 124a. Similarly, the piston pin-bore 124b of the skirt panel 116b includes a center-line C', which is align with and hidden behind center-line C with respect to the side-view shown in FIG. 2. The center-lines C, C' are parallel with and offset from the geometric center-line A of the piston 100 by a distance D, which in this example is about 0.6 mm. A plane P extends through the center-lines C, C' of the respective pin-bores 124a, 124b. The plane P partitions the piston 100 into a thrust side portion 126 and an anti-thrust side portion 128. The thrust side portion 126 of the piston 100 is defined between the first skirt end 114a and the plane P. The anti-thrust side portion 128 is defined between the second skirt end 114b and the plane P. A first length (L1) defined between the first skirt end 114a and the plane P is less than a second length (L2) defined between the second skirt end 114b and the plane P by the distance D of the off-site. In other words, the thrust side portion 126 has a first length (L1) that is less than the second length (L2) of the anti-thrust side portion 128.

Best shown in FIG. 1, the skirt portion 104 includes a peripheral distal end surface 130 opposite of the outer crown surface 106 of the crown portion 102. The inner panel surface 120b on the thrust side portion 126 of the piston 100 defines an internal first rib 132 extending between the first skirt end 114a and the pin boss 122b. The inner panel surface 120b on the anti-thrust side portion 128 of the piston 100 defines an internal second rib 134 extending between the second skirt end 114b and the pin boss 122b. The internal first rib 132, on the thrust side portion 126 of the piston 100, includes a width (W1) in the axial direction and the internal second rib 134, on the anti-thrust side portion 128 of the piston 100, includes a width (W2) in the axial direction. The width (W1) of the internal first rib 132 is greater than a (W2) of the internal second rib 134. The internal first and second ribs 132, 134 are located proximal to the peripheral distal end surface 130 of piston skirt portion 104.

Best shown in FIG. 2, the outer surface 118a of the skirt panel 116a defines an external rib 136 adjacent the peripheral distal end surface 130 and a plurality of stiffening ribs 138 extending from the pin boss 122a to the first and second skirt ends 114a, 114b. The thickness in a wall portion 139 of the skirt panel 116a located between the external rib 136 and an adjacent stiffening rib 138 includes a wall thickness of between 0.2 millimeter (mm) and less than 1.0 mm, which is difficult to achieve by casting or forging.

Best shown in FIG. 1, the outer surface 118a of the skirt panel 116a cooperates with the inner crown surface 108 to define a plurality of recessed pockets 140, 142, 144 at the interface of the skirt panel 116a and the inner crown surface 108. The recessed pockets 140, 142, 144 essentially eliminate material from unstressed locations of the piston 100. In the embodiment shown, an elongated recessed pocket 140 is defined adjacent the pin boss 122a. Also in the embodiment shown, a first and second recessed pockets 142, 144 are positioned on either ends of the elongated recessed pocket 140, thereby sandwiching the elongated recessed pocket 140 therebetween.

Referring to FIG. 3, a cross-sectional view of the piston 100 along lines 3-3 of FIG. 2 is shown. The additive manufacturing process, as disclosed in detail below, provides a plurality of printed layers 146 extending on a plane substantially perpendicular to a longitudinal axis A extending from the crown portion 102 to the skirt portion 104. Each of the layers 146 are fused with the adjoining layers 146 to provide a single piece monobloc structure. The fused layers 146 are substantially perpendicular to the direction of force (F) generated during the combustion process for managing the loading on the piston 100, thereby increasing the structural integrity and durability of the piston 100.

Figure 4:
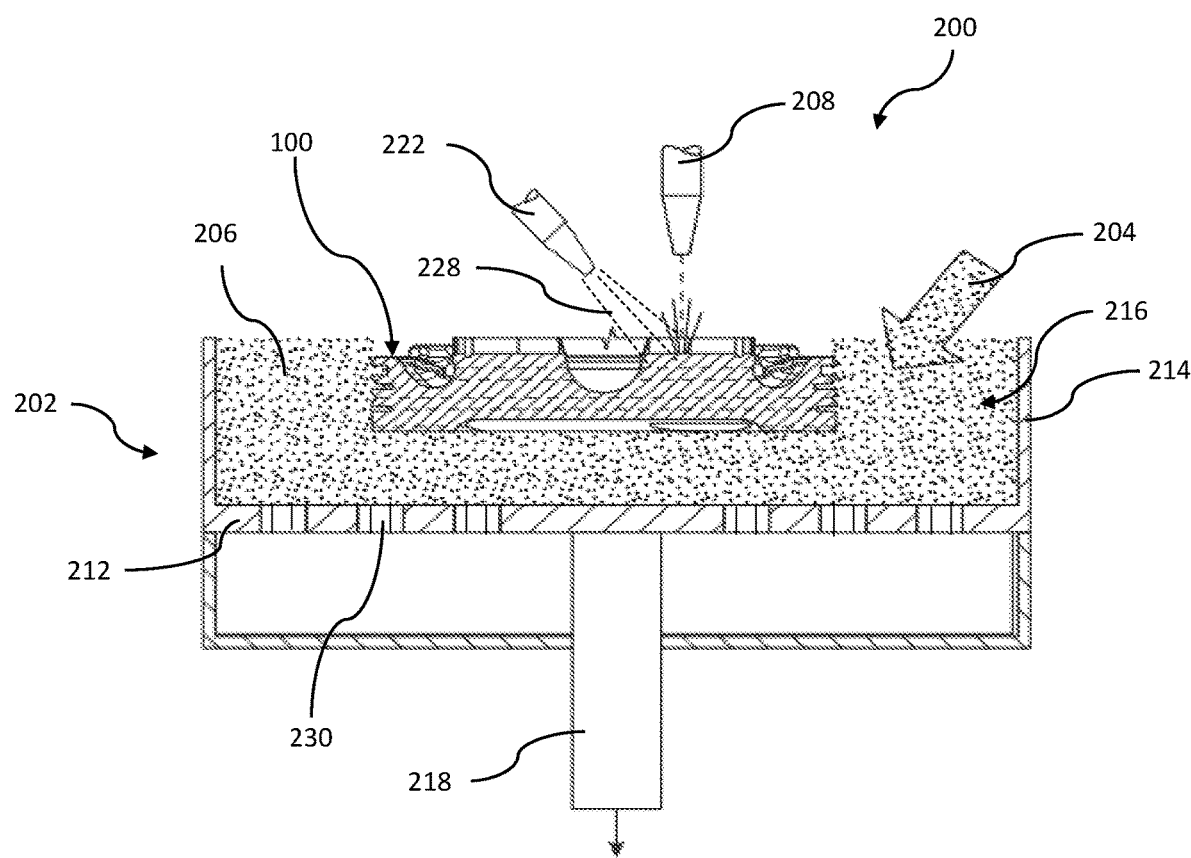
FIG. 4 is schematic illustration of a cross-sectional view of a system for the additive manufacturing of the piston of FIG. 1, according to an exemplary embodiment.

Referring to FIG. 4, a schematic illustration of an additive manufacturing System 200, such as a laser powder bed fusion (LPBF) system. The System 200 is configured to build the piston 100 by additive manufacturing utilizing direct metal laser sintering (DMLS) of a powdered material, layer-by-layer, directly from electronic data. The electronic data is generally provided in files from computer-aided design (CAD) software. The System 200 utilizes a laser beam as a moving heat source, to melt and fuse powdered metals, also referred to as metallic powders, and produce the piston 100 in a layer-wise fashion.

The System 200 includes a build platform 202, a powdered material dispenser 204 configured to dispense layers of powdered material 206 into the build platform 202, and an energy source 208 configured to direct and guide a focused thermal energy through predetermined 2-D patterns onto a top layer of the powdered material 206 in the build platform 202. The powdered material dispenser 204 is configured to adjust the thicknesses of the various layers of powdered material 206 as well as grading and removing the powdered material 206.

Powdered materials may include, but is not limited to, metal, ceramic, glass, polymeric powders, other meltable metal capable of undergoing a thermally induced phase change from solid to liquid and back again, or combinations thereof. For the additive manufacturing of the piston 100, it is preferable that the powdered material used is an aluminum alloy, which is described in detail below. While a laser is shown, other energy source 208 may include, but is not limited to, electron beams, infrared energy, and micro-wave energy capable of melting, fusing, sintering, amalgamating, and/or otherwise chemically or physically modifying the dispensed powdered material 206 to form the piston 100.

The build platform 202 includes a work bed 212 and a platform wall 214 surrounding the work bed 212 to define a powder chamber 216 for containing the powdered metal 206 dispensed by the powder dispenser 204. The build platform 202 further includes an actuator 218 engaged to the work bed 212 for selectively moving the work bed 212 apart from the focus energy source 208 at incremental distances equal to the thickness of a layer of powder dispensed by the powder dispenser 204, while the platform wall 214 remains in a fixed position. In an alternative embodiment, the work bed 212 may be held stationary and the focus energy focus energy source 208 is configured to move apart from the work bed 212 as additional layers of powdered material is added.

The powdered material dispenser 204 is selectively moveable across the powder chamber 216 to distribute sequential layers 211 of powdered metal 206 into the powder chamber 216. For each layer of distributed powdered metal 206, a roller or blade (not shown) sweeps away any excess powder into an overflow opening (not shown), thereby forming a thin uniformed thickness layer of powdered metal.

The additive manufacturing System 200 may include an inert gas source 222 configured to supply an inert atmosphere into the powder chamber 216 to reduce unwanted chemical interactions as well as to mitigate the risks of fire or explosion, especially with reactive powdered metals. The inert gas is supplied into the powder chamber 216 prior to and as the powdered metal 206 is dispensed into the powder chamber 216 by the powdered material dispenser 204. The inert gas source 222 is further configured to supply an inert gas stream 228 to aid the evacuation of the loose powdered metal 206 from the powder chamber 216 and remove loose powdered metal 206 from the post-build part.

In another embodiment, heating elements 230, such as electric heating elements 230 that are thermostatically controlled to pre-heat and maintain the temperature of the powdered metal 206 in the powder chamber 216 at a predetermined temperature. In this configuration, the piston 100 may be heat treated in-situ during the additive manufacturing process.

Figure 5:
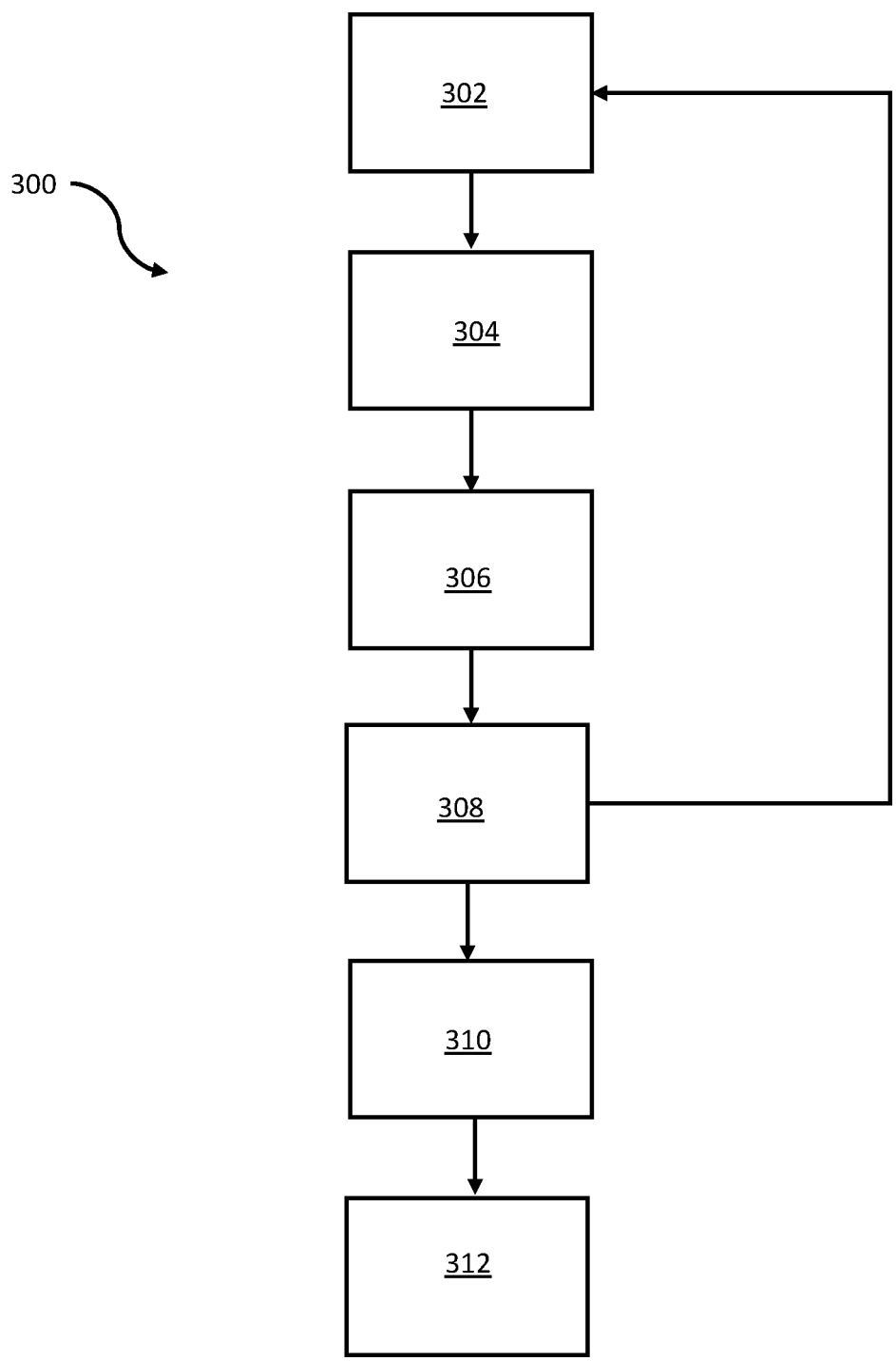
FIG. 5 is a block diagram of a method of additive manufacturing the piston of FIG. 1, according to an exemplary embodiment.

FIG. 5 is a flow chart 300 showing a method of making the piston 100 by additive manufacturing (Method 300) utilizing direct metal laser sintering (DMLS). In Block 302, a blanket of inert gas is introduced into the powder chamber 216 of the build platform 202 and a layer of powdered metal 206 is dispersed onto the work bed 212 in the powder chamber 216. The powdered metal 206 is that of an aluminum-cerium-silicon alloy (Al—Ce—Si alloy). The Al—Ce—Si alloy includes, by weight percent (wt %), from about 5 to wt % cerium (Ce), from about 0.1 to 5 wt % silicon (Si), from about 0.1 to 5 wt % nickel (Ni), from about 0.1 to 2 wt % zirconium (Zr), and a balance wt % of aluminum (Al). Preferably, from about 7 to 10 wt % Ce, from about 0.5 to 2 wt % Si, from about 2 to 4 wt % Ni, from about 0.5 to 1.5% Zr, and a remaining balance wt % Al.

In Block 304, a focused laser beam 208 is applied onto the top layer of powdered metal 206 and guided through a predetermined 2-dimensional (2-D) pattern. The focused laser beam 208 fuses a portion of powdered metal 206 defined by the 2-D pattern into a layer 146 of the piston 100.

The laser beam is configured for a scan spacing, also referred to as hatch distance, of 50 to 250 micron (μm), preferably 180-200 μm. The power output setting of the laser beam is between 350 to 400 watts (W), preferably 360 to 380 W. The laser beam moved at a scan speed at 1000 to 2000 millimeters per second (mm/s), preferably 1250 to 1500 mm/s. The focused laser includes a spot size of 50 to 100 microns (μm), preferably 70 to 90 μm.

In Block 306, the work bed 212 is spaced from the laser 208 at a predetermined distance that is substantially equal to the thickness of the next layer of the piston 100 that is being built. Another layer of powdered metal 206 is dispersed into the powder chamber 216 on top of the previously fused layer. This first layer, and subsequent layers, has a thickness of between about 0.02 millimeter (mm) to 0.1 mm, preferably from about 0.025 mm to 0.03 mm.

In Block 308 the focused laser beam 210 is directed onto the new layer of the powdered metal 206 in another predetermined 2-D pattern, thereby fusing another layer onto the previously formed layer. Each newly formed layer is fused with the previously formed layer. The process of Blocks 302 through 308 are repeats until the layer-by-layer building of the piston 100 is completed. Each of the layers are substantially perpendicular to the A-axis of the piston 100.

In Block 310, after the manufacture of the piston 100 is completed, the loose non-fused powdered metal 206 is removed from the powder chamber 216 to expose the completed piston 100. A stream of pressurized gas is selectively directed onto the completed piston 100 in short bursts to remove any lose power metal 206 remaining on the piston 100. In Block 312, the piston 100 is removed from the platform and heat treated to desired specification.

In an alternative embodiment, the piston 100 may be heat treated in-situ within the powder chamber 216 during the additive manufacturing process. The in-situ heat treatment is accomplished by pre-heating the powdered metal at a temperature of 300° C. to 400° C., preferably at 340 to 360° C., before introducing the powdered metal 206 into the powder chamber 216. The powdered metal 206 in the powder chamber 216 is maintained at the same temperature during the additive manufacturing of the piston 100. After the completion of build, the temperature of the piston 100 is maintained at the same temperature for an additional 5 to 10 hours, preferably 6 to 8 hours, in the powder chamber 216.

The above disclosed additive manufacturing Method 300 of making the piston 100 provides the benefits of having thinner skirt walls than what can be provided by traditional methods of casting or forging. The Method 300 also provides the benefits of locating internal ribs 132, 134 on the inner panel surface 120 of the skirt portion 104 and recessed pockets 140, 142, 144 between the outer panel surface 118 and inner crown surface 108, which were not possible to produce with conventionally tooled dies. The Method 300 further provides the benefits of allowing the use of non-castable materials having improved high temperature fatigue strength such as the Al—Ce—Si alloy. The Method 300 still further provides the benefit of using powdered materials capable of undergoing a thermally induced phase change from solid to liquid and back again. Examples of such powdered materials includes, but not limited to, powered metal alloys, ceramics, glass, polymeric powders, and combinations thereof. The Method 300 also provides the benefit of the external surfaces of the piston 100, particularly the crown portion 102 and the skirt portion 104, being free of hash marks, which are required in a casting process for the ease of removal of the cast piston from the dies and are required to be machined smooth.

Numerical data have been presented herein in a range format. The term "about" as used herein is known by those skilled in the art. Alternatively, the term "about" includes +/−0.05% by weight. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A piston for an engine of a vehicle, comprising:
   a crown portion having a peripheral side surface and an inner crown surface;
   a skirt portion comprising:
      a pair of skirt ends extending from the peripheral side surface; and
      a pair of skirt panels extending from the inner crown surface and interconnecting the pair of skirt ends, wherein at least one of the pair of skirt panels include an outer panel surface, an inner panel surface opposite the outer panel surface, and a pin boss; and
   wherein the outer panel surface cooperates with the inner crown surface to define at least one recessed pocket at an interface between the outer panel surface and the inner crown surface;
   wherein the skirt portion further comprises a peripheral distal end surface;
   wherein the outer panel surface of the at least one of the pair of skirt panels defines an external rib adjacent the peripheral distal end surface and at least one stiffening rib extending from the pin boss to one of the pair of skirt ends;
   wherein the at least one of the pair of skirt panels includes a wall portion defined between the external rib and the at least one stiffening rib; and
   wherein the wall portion includes a wall thickness of between 0.2 mm and 1.0 mm.

2. The piston of claim 1, wherein the at least one recessed pocket includes an elongated recessed pocket located between the pin boss and the peripheral side surface of the crown portion.

3. The piston of claim 2, wherein the at least one recessed pocket further includes a first recessed pocket and a second recessed pocket sandwiching the elongated recessed pocket therebetween.

4. The piston of claim 1,
   wherein the pin boss of the at least one of the pair of skirt panels defines a piston pin-bore having a center-line off-set from a geometric center-line of the piston thereby defining (i) a thrust side portion between one of the skirt ends and the center-line of the piston pin-bore, and (ii) an anti-thrust side portion between the other of the skirt ends and the center-line of the piston bore; and wherein the inner panel surface of the at least one of the pair of skirt panels defines a first internal rib on the thrust side portion and a second internal rib on the anti-thrust side portion.

5. The piston of claim 4, wherein the first internal rib includes a first width (W1) and the second internal rib includes a second width (W2), wherein W1 is greater than W2.

6. The piston of claim 1, wherein the piston is a single piece monobloc body comprising a plurality of sintered layers of a metal alloy, wherein the plurality of sintered layers are perpendicular to a direction of a force generated by a combustion process acting on the piston.

7. The piston of claim 6, wherein the metal alloy comprises:
   from about 5 to 15 wt % cerium (Ce);
   from about 0.1 to 5 wt % silicon (Si);
   from 0.1 to 5 wt % nickel (Ni);
   from about 0.1 to 2 wt % zirconium (Zr);
   and a balance wt % of aluminum (Al).

8. The piston of claim 6, wherein the metal alloy comprises:
   about 7 to 10 wt % Ce;
   from about 0.5 to 2 wt % Si;
   from about 2 to 4 wt % Ni;
   from about 0.5 to 1.5 wt % Zr;
   and a remaining balance wt % Al.

9. The piston of claim 6, wherein at least one of the plurality of the sintered layers of metal alloy includes a thickness of from 0.02 millimeter (mm) to 0.1 mm.

10. An additive manufactured piston, comprising a metal alloying having:
    from about 5 to 15 wt % cerium (Ce);
    from about 0.1 to 5 wt % silicon (Si);
    from 0.1 to 5 wt % nickel (Ni);
    from about 0.1 to 2 wt % zirconium (Zr);
    and a balance wt % of aluminum (Al).

11. The piston of claim 10, wherein the piston comprises a skirt panel comprising an inner panel surface, an outer panel surface, and a wall portion having a thickness of between 0.2 mm and 1.0 mm between the inner panel surface and the outer panel surface.

12. The piston of claim 11, wherein the skirt panel further comprises:
    a thrust side portion;
    an anti-thrust side portion;
    a first internal rib located defined on the inner panel surface of the skirt panel on the thrust side portion; and
    a second internal rib defined on the inner panel surface on the anti-thrust side portion; and
    wherein the first internal rib includes a width (W1) and the second internal rib includes a width (W2), and wherein W2 is less than W1.

13. The piston of claim 12, further comprises a crown portion having an inner crown surface; and
    wherein the outer panel surface defines a plurality of recessed pockets located at an interface between the inner crown surface and the outer panel surface.

14. The piston of claim 13, further comprising:
    a plurality of sintered layers perpendicular to a direction of force exerted on the crown portion of the piston by a combustion process.

15. A method of additive manufacturing a piston, comprising:
    sintering a plurality of layers of a powdered metal alloy to build a monobloc piston, wherein the metal alloy includes:
    from about 5 to 15 wt % cerium (Ce);
    from about 0.1 to 5 wt % silicon (Si);
    from 0.1 to 5 wt % nickel (Ni);
    from about 0.1 to 2 wt % zirconium (Zr);
    and a balance wt % of aluminum (Al).

16. The method of claim 15, wherein the powdered metal alloy includes:
    about 7 to 10 wt % Ce;
    from about 0.5 to 2 wt % Si;
    from about 2 to 4 wt % Ni;
    from about 0.5 to 1.5 wt % Zr;
    and a remaining balance wt % Al.

17. The method of claim 15, further comprising:
    pre-heating the powdered metal alloy at a temperature of 300° C. to 400° C. before sintering;
    maintaining the powdered metal alloy at the temperature of 300° C. to 400° C. during sintering; and
    maintaining the sintered layers of the powdered metal alloy at the temperature of 300° C. to 400° C. for 5 to 10 hours.

18. The method of claim 15, wherein the layers are perpendicular to a direction of force exerted on the piston by an internal combustion process.

19. The method of claim 18, wherein at least one of the layers include a thickness of between about 0.02 millimeter (mm) to 0.1 mm.

20. The piston of claim 1, wherein the piston is a single piece monobloc body comprising a plurality of sintered layers of a metal alloy.

* * * * *